Dec. 15, 1959   E. F. PETERSON   2,917,290
VIBRATOR
Filed April 25, 1957   2 Sheets-Sheet 2
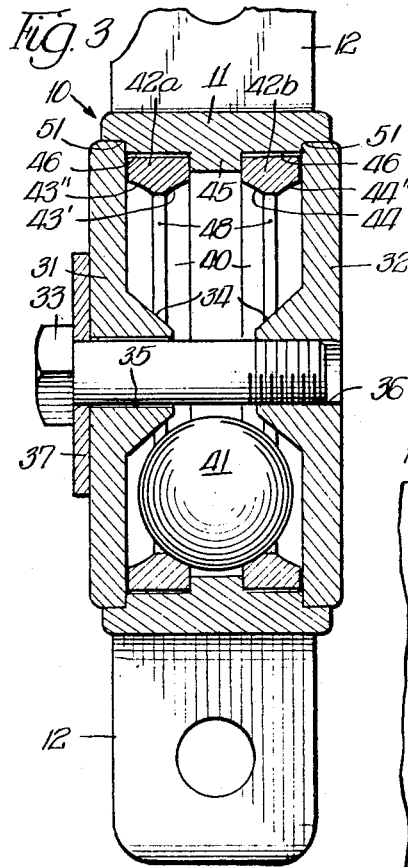
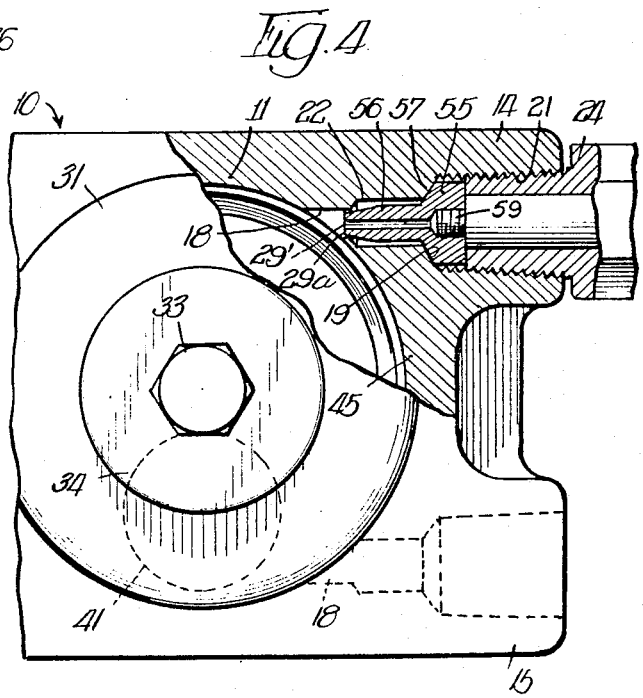
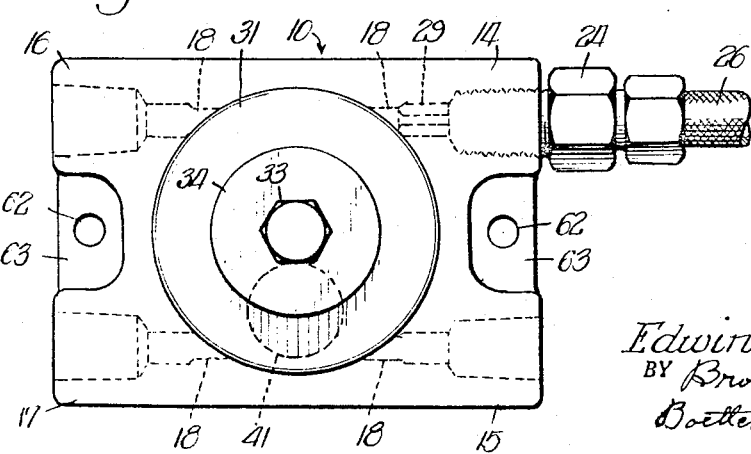
INVENTOR.
Edwin F. Peterson,
BY Brown, Jackson,
Boettcher & Dienner
Attys

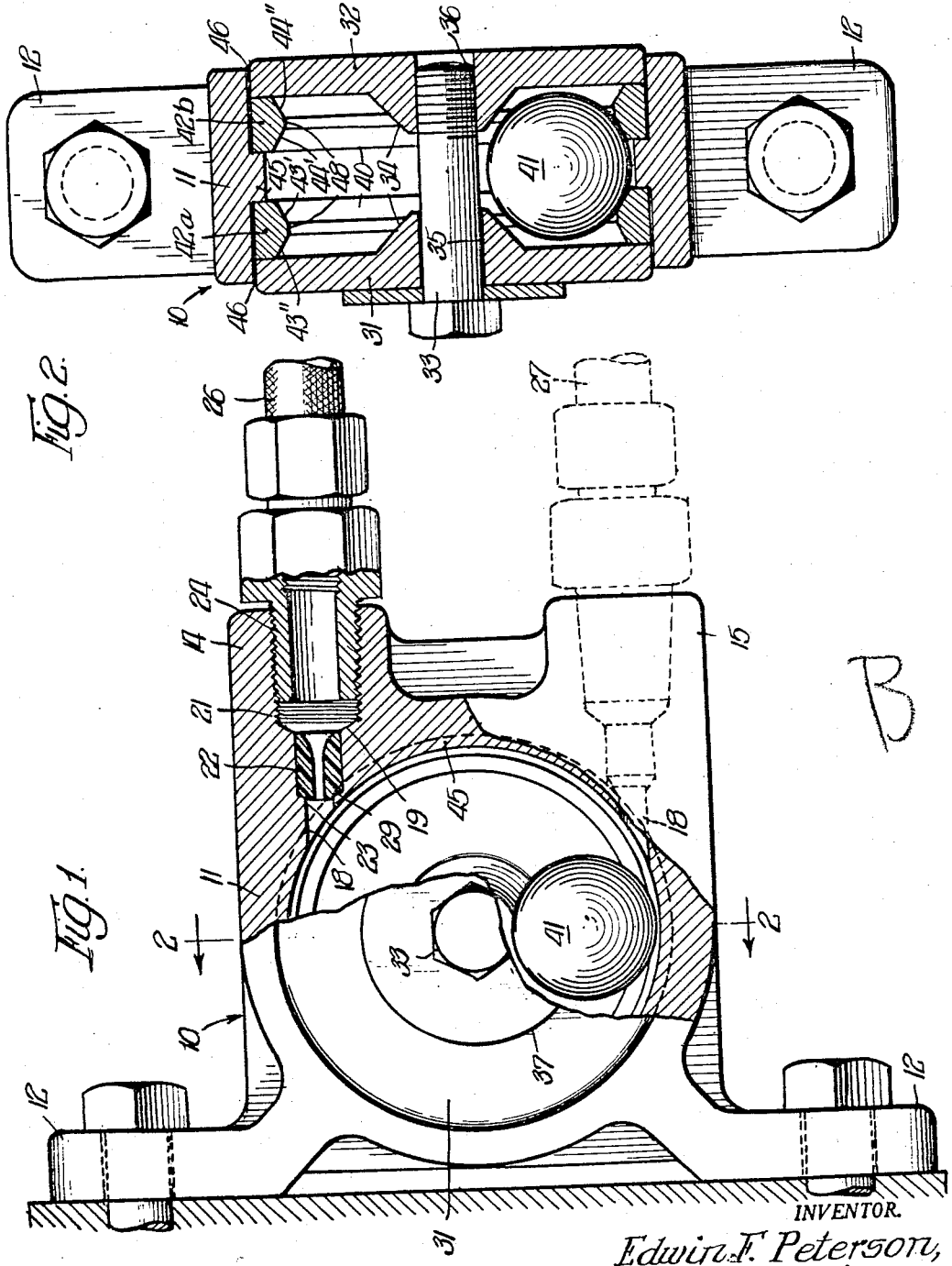

United States Patent Office 2,917,290
Patented Dec. 15, 1959

2,917,290

VIBRATOR

Edwin F. Peterson, Neponset, Ill.

Application April 25, 1957, Serial No. 655,102

15 Claims. (Cl. 259—1)

The present invention relates to vibrators of a type particularly adapted for industrial application such as for vibrating core boxes, match plates and other sand molding apparatus for obtaining a clean separation of the patterns and mold parts; or for vibrating bins, hoppers and chutes to insure the flow of comminuted material therein; or for vibrating various other types of machines or apparatus wherever a high frequency vibration is desired.

My improved vibrator is of the type utilizing a rolling ball which is caused to revolve in a circular raceway under the impelling action of a jet of compressed air or other pressure fluid which is discharged substantially tangentially of the circular raceway. The improved vibrator herein disclosed embodies improvements upon the vibrators disclosed in my prior Patents Nos. 2,480,603, 2,518,250, 2,528,319 and 2,535,596.

One of the principal objects of the invention is to improve upon the construction of the circular raceway by making it out of two readily removable race rings having dual sets of raceway surfaces, whereby when one set of raceway surfaces becomes worn or uneven from the rolling action of the ball, the two race rings can be removed from the vibrator housing and reversed or transposed one with the other so as to present the other set of raceway surfaces to the rolling action of the ball. Thus, the wear life of the vibrator is doubled. More particularly with regard to this feature of the invention, each of the two race rings has its opposite inner edges formed with oppositely sloping beveled raceway surfaces, whereby each ring has a dual set of raceway surfaces, either one of which can be presented to the rolling action of the ball by either turning the ring around in the housing or by transposing the ring from one side of the housing to the other.

Another object of the invention is to provide an improved rotatable relation of the dual raceway rings in cooperation with a particular location of the air inlet jet. The dual raceway rings are mounted in parallel relation in the vibrator housing with a narrow intervening space therebetween, and the air inlet jet is positioned to discharge tangentially into this intervening space. Thus, there are no windows or openings carried by the raceway structure which would get out of alignment with the air inlet jet if the raceway structure should rotate. Hence, the dual race rings can have a moderately loose fit in the housing, sufficient to permit at least a migratory rotation of the rings with the rolling motion of the ball. This minimizes the tendency for scallop-shaped depressions or other uneven formations to become worn in the raceway surfaces.

Another object of the invention is to provide an improved vibrator of the class described wherein the race rings and the ball are composed of tungsten carbide, or of metal-ceramic or sintered powdered metal compounds. Race rings made of any of the above metal-ceramic compositions are quite brittle or fracturable. Heretofore, the necessity of forcing a single such race ring into the vibrator housing with a drive or force fit in order to prevent its rotation in the housing has resulted in a large ratio of fractured rings. This is avoided by the above described use of two separate race rings which are loosely inserted in the housing so that they are capable of migratory rotation, the loose fit avoiding the fracture of the race rings in their original insertion or in their reversed or transposed replacement.

Another object of the invention is to provide an improved construction and arangement of air inlet jet discharging between the pair of race rings. One embodiment of improved jet comprises a series of interchangeable jet bushings having different calibrated orifices therethrough; which enable the vibrator to be adjusted to different volumes of air and different rotative speeds by the mere substitution of different jet bushings having different calibrated passageways therethrough. These jet bushings are preferably composed of a thermoplastic material, or of a thermosetting plastic, such as nylon, Teflon or the like, which can be readily molded to have the different calibrated orifices therein, and which can also be molded to have these orifices shaped with a venturi configuration, where such a configuration is desired for accelerating air flow.

Another embodiment of the improved jet comprises an interchangeable jet bushing or jet insert which is provided with an internally threaded counterbore adapted to receive the threaded end of an extraction screw, so as to facilitate the operation of removing the jet bushing or jet insert from the vibrator housing for the substitution of a different bushing or insert.

Another object of the invention is to provide the vibrator housing with an improved multiple arrangement of air flow bosses each aligned tangentially of the ball raceway and adapted to be used selectively or alternatively for either inlet flow connection with a compressed air supply hose, or for discharge flow directly to atmosphere or through air discharge hoses. The above described use of two laterally spaced raceway rings makes it practicable to exhaust the spent air through ports leading from between the two rings into threaded discharge bosses, so that the compressed air can readily be passed successively from one vibrator to another. The multiple boss arrangement also enables the air inlet jet of a particular vibrator to be faced in one direction into the ball raceway for effecting one direction of ball rotation, or to be readily faced in the other direction into the raceway for effecting the opposite direction of ball rotation.

Other objects, features and advantages of the invention will appear from the following detail description of certain preferred embodiments of the invention. In the accompanying drawings illustrating such embodiments:

Figure 1 is a plan or side view, partly in plan and partly in section, showing one embodiment of the invention.

Figure 2 is a transverse sectional view thereof, taken approximately on the plane of the line 2—2 of Figure 1.

Figure 3 is a fragmentary view similar to Figure 2 showing different modifications of the construction.

Figure 4 is another fragmentary view similar to Figure 1, showing a modified form of air inlet jet, and Figure 5 is a side elevational view, on a smaller scale, showing a modified embodiment having multiple air flow bosses.

The vibrator comprises a housing 10 cast in the form of a circular ring portion 11 from which project apertured mounting feet or lugs 12. Bolts are adapted to pass through these apertured mounting feet for securing the vibrator to the machine or apparatus which is to be vibrated. Projecting substantially tangentially from the ring portion 11 are two or more bosses 14, 15, etc. for establishing a compressed air inlet connection and an exhaust air outlet connection. These bosses have duplicate or symmetrical bores 18 at their inner ends which expand outwardly at the sloping shoulders 19 into duplicate outer counterbores 21. The latter are internally threaded for receiving coupling nipples 24 adapted to establish connection with an air supply hose 26, and possibly with an air discharge hose 27. The bore 18 which is to serve as the compressed air inlet is provided with a removable jet bushing or insert 29, which will be later described.

The ring portion 11 is open on both sides, and is adapted to be closed by two circular removable covers 31 and 32 which are held in assembled relation on opposite sides of the ring portion by an axially extending cap screw 33. Projecting inwardly from the inner faces of the two cover discs 31, 32 are conically tapered bosses 34 which define the central portion of the ball raceway. The cap screw 33 passes through a plain hole 35 in the cover disc 31, and threads into a tapped hole 36 in the cover disc 32. A washer 37 may be interposed between the head of the cap screw 33 and the cover disc 31.

Defined within the ring portion 11 is a circular raceway 40 in which a ball 41 is adapted to travel in an orbital path under the impetus of a stream of compressed air entering through the air inlet jet 29. The raceway 40 comprises the aforementioned dual race rings, which are of identical symmetrical construction and are designated 42a and 42b. Each race ring has its opposite inner edges formed with oppositely beveled dual or symmetrical raceway surfaces 43', 43" and 44', 44", which dual surfaces have identical angles of slope. Between these dual raceway surfaces, each ring is formed with a flat or truncated surface 48. This flat annular surface 48 minimizes the possibility of the brinneling or chipping of one raceway surface carrying over to the adjoining raceway surface under the rolling action of the ball. The inner parallel surfaces of the race rings 42a and 42b are maintained in spaced relation in the housing ring 11 by an intervening annular rib 45 which projects inwardly a slight distance from the cylindrical inner surface 46 of the housing ring 11. The inner bores 18 of the air inlet and outlet bosses 14 and 15 extend through this central annular rib 45 for communicating centrally of the raceway 40. In the embodiment shown in Figure 2 the two cover discs 31 and 32 fit within the cylindrical inner surface 46 of the housing ring portion 11 and bear directly against the parallel outer surfaces of the race rings 42a and 42b. These race rings have a relatively loose fit within the cylindrical inner surfaces 46 of the housing ring portion 11, so as to permit easy insertion and removal of the race rings to and from the housing, without subjecting the race rings to the possibility of breakage in such insertion and removal. This loose fit also permits some migratory rotation of the race rings 42a and 42b within the housing, owing to the torque effect of the high speed rolling ball 41 without disturbing the functional relation of the air inlet and the air outlet. The cover discs 31 and 32 may partake of some of this migratory rotation of the race rings 42a, 42b, depending upon the tightness of fit of the cover discs within the cylindrical surfaces 46.

Whenever one pair or set of dual raceway surfaces becomes worn from the high speed vibratory rotation of the rolling ball 41, the cover discs 31, 32 are removed, and the race rings 42a, 42b are reversed or transposed so as to present the other pair or set of dual raceway surfaces to the rolling action of the ball 41. For example, the race rings 42a, 42b may be retained on their same sides of the vibrator housing by merely reversing or turning the rings around; or they may be transposed from one side of the vibrator housing to the other; in either of which situations they present the new or alternate set of raceway surfaces to the rolling action of the ball. By virtue of this interchangeability of the dual raceway surfaces, the wear life of the raceway is substantially doubled. The air inlet jet and the air outlet function independently of the angular positions assumed by the race rings relatively to the air inlet jet and to the air outlet when the race rings are thus reversed or transposed within the housing.

By reason of the loose fit of the race rings 42a, 42b in the cylindrical surfaces 46 of the housing ring 11, it becomes practicable to construct these race rings of tungsten carbide or other metal-ceramic compounds. The loose fit avoids the relatively high ratio of fractures to which these very brittle race rings are subjected when they must be inserted and removed forcibly by reason of force fit. The ball 41 may also be composed of tungsten carbide or of metal-ceramic compound. These hard metal-ceramic compounds greatly increase the wear life of the vibrator.

Referring now to the embodiment of inlet jet bushing 29 shown in Figure 1, this bushing is composed of a thermoplastic material, or of a thermosetting plastic, such as nylon, Teflon or the like. The plastic composition of the bushings enables each bushing to deform itself when being pushed into the counterbore so as to secure a tight fit of the bushing within the counterbore. Thus, these jet bushings can be molded at small expense with different sized calibrated orifices, and, if desired, these orifices may be formed with a venturi configuration. This plastic jet bushing 29 engages in an intermediate counterbore 22 formed between the inner bore 18 and the threaded outer counterbore 21, the bushing merely having a snug push fit in this intermediate counterbore 22 so that it can be readily removed therefrom for the substitution of other bushings having different sizes of calibrated orifices. The inner end of the bushing 29 abuts the shoulder 23 formed between the bore 18 and the intermediate counterbore 22 so as to prevent the inner end of the bushing from projecting into the circular raceway into the path of the rolling ball. The length of the jet orifice bushing 29 is not critical because if it is abnormally long the outer end thereof will merely enter the bore of the coupling nipple 24. The use of the separate jet bushings 29 also eliminates the expense resulting from the breakage of small drills and the loss of castings arising in the prior practice of drilling out the jet orifices. Heretofore, the conventional practice has been to drill out the inlet jet orifice to the calibrated size directly in the original casting with a small drill. These small drills have a substantial incidence to breakage, and when one breaks while deep in the casting it is usually necessary to throw the casting away.

The other companion boss 15 preferably has the same relation of inner bore 18, outer counterbore 21 and intermediate counterbore 22. Thus, the inlet jet bushing 29 may be inserted into this companion boss 15 if it is desired that the ball have the opposite direction of rotation.

The discharge of air from the vibrator, which can be through either boss 14 or 15, may vent directly to atmosphere, or it may be connected through a discharge hose 27 leading to a point outside of the enclosed area, or leading to the inlet of another vibrator, in situations where a plurality of vibrators are connected together in slave sequence.

In Figure 3 I have shown a modified construction in which the peripheral edges of the cover discs 31 and 32 seat in annular seating recesses or notches 51 formed at the ends of the cylindrical inner surfaces 46. By this construction, the inward pressure exerted on the cover discs by the central cap screw 33 is borne by the housing through the seating recesses 51, rather being borne by the dual raceway rings 42a, 42b. This modified construction reduces still further the possibility of breakage of the readily fracturable raceway rings, and this modified construction may also be utilized to give greater freedom of rotation to the raceway rings if it is desired that they have more freedom of rotation.

Figure 3 shows a modified construction of the raceway rings 42a, 42b. In this construction the raceway surfaces 43', 43" and 44', 44" are made with a concave curvature instead of with a flat bevel. The concave curvature has substantially the same radius as the ball 41, so that the ball has more area of contact with the raceway.

In Figure 4 I have shown a modified construction of air inlet bushing 29a. This bushing comprises an enlarged head 55 from which extends a reduced nozzle or jet portion 56, the inner end of the head joining the nozzle portion through a sloping shoulder 57. The head 55 is received in the threaded outer counterbore 21, with the sloping shoulder 57 abutting against the companion shoulder 19 in the casting. Formed at the outer end of the calibrated orifice 29' is a threaded counterbore 59. This threaded counterbore 59 is provided so as to permit an extraction screw to be threaded into the counterbore when it is desired to remove the inlet bushing 29a. This inlet bushing 29a may be composed of metal or plastic, as desired.

In Figure 5 I have shown still another modified embodiment wherein the vibrator housing 10 is formed with four air flow bosses 14, 15, 16 and 17, with the bosses 16 and 17 facing in opposition to the bosses 14 and 15. All four bosses have the previously described arrangement of symmetrical or duplicate inner bores 18 and intermediate counterbores 22, depending upon the type of jet bushing that is to be used therein. Any one of these four bosses can be connected up with the air supply hose 26, and any one, two or three of the remaining bosses may be utilized as discharge outlets, for discharging either directly to atmosphere, or through one or more discharge hoses 27 leading to points outside of the enclosure, or to other slave vibrators. The need of having the air discharge occur through a discharge hose 27 frequently arises in situations where the vibrating unit is immersed in liquids or granular materials to which aeration would be detrimental; or in certain sanitary situations and where toxic or dangerous dusts are handled. In such situations, when using the multiple boss embodiment shown in Figure 5, and particularly where a single discharge hose 27 is adequate for discharging all of the air, the other two air flow bosses can be closed by screw plugs.

Experiment has established that if boss 14 is used as the air inlet boss, it is entirely practicable to utilize the opposite boss 16 as an air discharge boss, even though it faces in opposition to inlet boss 14, with only a small part of the orbital path of the ball 41 intervening. A vibrator operated in such manner performs with substantially the same speed and air economy as those in which the air discharge occurs through boss 15. In this four boss construction, the mounting may be effected by passing the fastening bolts or screws through apertures 62 formed in webs 63 extending between the opposing pairs of bosses.

Referring again to the two separate race rings 42a, 42b, these are easier to make and take less material than the prior single ring construction having two separate tracks or rails joined together by an integral intervening web portion. This web portion has to have a window opening therein through which the inlet jet of compressed air occurs, and the provision of which window opening requires that the ring have a tight press fit in the housing to prevent rotation of the ring, which would otherwise carry the window opening out of alignment with the air inlet passageway. The space between the two rings 42a, 42b, and the fact that the air discharge occurs from this space, also renders the vibrator self-cleaning, because grit, surplus oil, water and other foreign substances may migrate orbitally without interference with the ball travel, and such grit and other foreign substances will be discharged centrifugally through a discharge port 18 leading through the spacing rib 45.

While I have illustrated and described what I regard to be the preferred embodiments of my invention, nevertheless it will be understood that such are merely exemplary, and that numerous modifications and rearrangements may be made therein without departing from the essence of the invention.

I claim:

1. In a vibrator of the class described, the combination of a housing, a pair of symmetrical circular race rings removably mounted in said housing and defining therebetween a circular raceway, a ball rolling in said circular raceway, an air inlet jet opening into said housing between said race rings, and an air outlet for discharging air from said housing, both of said race rings having their opposite inner edges formed with symmetrical sloping raceway surfaces, whereby after one set of raceway surfaces has become worn by the rolling action of the ball the race rings can be reversed or transposed to present the other set of raceway surfaces to the rolling action of the ball, said air inlet jet and said air outlet functioning independently of the angular positions assumed by said race rings relatively to said air inlet jet and to said air outlet when said race rings are thus reversed or transposed within said housing.

2. In a vibrator of the class described, the combination of a housing having a circular ring portion, a circular rib projecting inwardly from said circular ring portion, two symmetrical race rings removably mounted in said housing in spaced relation on opposite sides of said rib and defining therebetween a circular raceway, an air inlet jet discharging a stream of compressed air into said circular raceway through said rib, a ball rolling in said circular raceway under the impetus of said stream of air, and an air outlet for discharging spent air from said housing, both of said race rings having their opposite inner edges formed with symmetrical sloping raceway surfaces, whereby after one set of raceway surfaces has become worn by the rolling action of the ball the race rings can be reversed or transposed to present the other set of raceway surfaces to the rolling action of the ball, said air inlet jet and said air outlet both functioning independently of the angular positions assumed by said race rings relatively to said air inlet jet and to said air outlet when said race rings are thus reversed or transposed within said housing.

3. In a vibrator, the combination of a housing, dual symmetrical race rings removably mounted in said housing and defining therebetween a circular raceway, a fluid inlet jet discharging a stream of fluid into said circular raceway, a ball rolling in said circular raceway under the impetus of said stream of fluid, and an air outlet for discharging spent air from said housing, said race rings having dual symmetrical raceway surfaces which can be transposed one for the other by the removal and repositioning of said rings in said housing, said fluid inlet jet and said air outlet both functioning independently of the angular positions assumed by said race rings relatively to said fluid inlet jet and to said air outlet when said race rings are thus reversed or transposed within said housing.

4. In a vibrator of the class described, the combination of a housing, a circular raceway defined in said housing, a ball rolling in said circular raceway, an air inlet for discharging compressed air into said circular raceway for rolling said ball therein, and an air outlet for discharging spent air from said housing, said circular raceway comprising a race ring which is capable of rotary movement in said housing under the impelling action of said ball without disturbing the functional relation of said air inlet and said air outlet.

5. In a vibrator of the class described, the combination of a housing, a pair of parallel spaced race rings defining a circular raceway in said housing, a ball rolling in said circular raceway, an air inlet discharging compressed air into said circular raceway for rolling said ball therein, and an air outlet for discharging spent air from said housing, said pair of race rings being capable of migratory rotation in said housing under the impelling action of said ball, said air inlet discharging through the space between said race rings so as not to be affected by such migratory rotation of said rings.

6. In a vibrator of the class described, the combination of a housing, a circular raceway defined in said housing, a ball rolling in said circular raceway, first and second symmetrical passageways in said housing extending between said circular raceway and the exterior of said housing, and an inlet bushing in said first passageway enabling said first passageway to serve as an air inlet to said raceway and said second passageway to serve as an air outlet from said raceway, said inlet bushing being insertable alternatively in said second passageway whereby said latter passageway then serves as an air inlet and said first passageway serves as an air outlet.

7. In a vibrator of the class described, the combination of a housing, a circular raceway defined in said housing, a ball rolling in said circular raceway, an air inlet opening into said circular raceway and an air outlet for discharging air from said housing, said raceway comprising a removable race ring composed of a metal-ceramic compound, said race ring being rotatable in said housing under the impelling action of said ball without distorting the functional relation of said air inlet and said air outlet.

8. In a vibrator of the class described, the combination of a housing, a circular raceway defined in said housing, an air inlet discharging a stream of compressed air into said circular raceway an air outlet for discharging spent air from said raceway, and a ball rolling in said circular raceway under the impetus of said stream of air, said circular raceway being rotatable in said housing under the impelling action of said ball without disturbing the functional relation of said air inlet and said air outlet, said ball being composed of a metal-ceramic compound.

9. In a vibrator of the class described, the combination of a housing having a circular ring portion, a circular rib projecting inwardly from said circular ring portion, two symmetrical race rings removably mounted in said housing in spaced relation on opposite sides of said rib and defining therebetween a circular raceway, two cover discs closing the opposite sides of said circular ring portion on the outer sides of said race rings, a bolt connecting said two cover discs together, an air inlet passageway passing through said circular rib and entering said circular raceway substantially tangentially, an air discharge passageway leaving said circular raceway through said circular rib, and a ball rolling in said circular raceway under the impetus of a stream of air discharged through said air inlet passageway, both of said race rings being of identical uniform cross-section throughout their entire peripheral dimensions and having their opposite inner edges formed with symmetrical sloping raceway surfaces, whereby after one set of raceway surfaces has become worn by the rolling action of the ball the race rings can be reversed or transposed to present the other set of raceway surfaces to the rolling action of the ball, said air inlet passageway and said discharge passageway both functioning independently of the angular positions assumed by said race rings relatively to said passageways when said race rings are thus reversed or transposed in said housing.

10. In a vibrator of the class described, the combination of a housing having a circular ring portion, a circular rib projecting inwardly from said circular ring portion, two symmetrical race rings removably mounted in said housing in spaced relation on opposite sides of said rib and defining therebetween a circular raceway, two cover discs closing the opposite sides of said circular ring portion on the outer sides of said race rings, a clamping bolt connecting said two cover discs together, the peripheries of said cover discs engaging seating surfaces on said circular ring portion whereby the clamping pressure of said clamping bolt is not transmitted to said two race rings, an air inlet passageway passing through said circular rib and entering said circular raceway substantially tangentially thereof, an air inlet jet bushing having a predetermined size orifice removably mounted in said air inlet passageway, whereby said bushing can be removed and substituted by another inlet bushing having a different size orifice, an air discharge passageway discharging from said circular raceway substantially tangentially thereof through said circular rib, and a ball rolling in said circular raceway under the impetus of a stream of compressed air entering through said air inlet passageway, both of said race rings being of identical uniform cross-section throughout their entire peripheral dimensions and having their opposite inner edges formed with symmetrical sloping raceway surfaces, whereby after one set of raceway surfaces has become worn by the rolling action of the ball the race rings can be reversed or transposed to present the other set of raceway surfaces to the rolling action of the ball, the location of said air inlet and said air discharge passageways within said circular rib and the uniform cross-section of said race rings enabling said air inlet and air discharge passageways to function independently of the angular positions assumed by said race rings relatively to said passageways when said race rings are thus reversed or transposed within said housing.

11. In a vibrator, the combination of a housing, dual symmetrical race rings removably mounted in said housing and defining therebetween a circular raceway, a fluid inlet jet discharging a stream of fluid into said circular raceway, a ball rolling in said circular raceway under the impetus of said stream of fluid and an air outlet for discharging spent air from said housing, said race rings having dual symmetrical raceway surfaces which can be transposed one for the other by the removal and repositioning of said rings in said housing, each of said race rings also having a substantially flat intermediate surface located medially between the dual raceway surfaces of the ring, said inlet jet and said outlet functioning independently of the angular positions assumed by said race rings relatively to said inlet jet and to said outlet when said race rings are thus transposed within said housing.

12. In a vibrator of the class described, the combination of a housing having a circular ring portion, a circular rib projecting inwardly from said circular ring portion, two identical symmetrical race rings mounted in said housing in spaced relation on opposite sides of said rib and defining therebetween a circular raceway, an air inlet jet discharging a stream of compressed air into said circular raceway through said rib, a ball rolling in said circular raceway under the impetus of said stream of air, and an air outlet for discharging spent air from said housing, both of said race rings being readily removable from said housing for permitting said rings to be interchanged in position in said housing or to be substituted by other rings, said air inlet jet and said air outlet both functioning independently of the angular positions assumed by said race rings relatively to said air inlet jet and said air outlet when said race rings are thus interchanged in position in said housing.

13. In a vibrator of the class described, the combination of a housing, a pair of identical symmetrical circular race rings mounted in said housing and defining therebetween a circular raceway, an air inlet jet discharging a stream of compressed air into said circular raceway between said race rings, a ball rolling in said circular raceway under the impetus of said stream of air, and an air outlet for discharging spent air from said housing, both of said race rings being readily removable from said housing for enabling said rings to be interchanged in position in said housing or to be substituted by new rings, said air inlet jet and said air outlet both functioning independently of the angular positions assumed by said race rings relatively to said air inlet jet and said air outlet when said race rings are thus interchanged in position in said housing.

14. In a vibrator of the class described, the combination of a housing, a circular raceway defined in said housing, a ball rolling in said circular raceway, an air inlet opening into said housing, a coupling for establishing connection between said air inlet and a source of compressed air supply, a counterbore in said housing in prolongation of said air inlet, a stop shoulder between the inner end of said counterbore and said circular raceway, and a substitutable air inlet bushing separate from said coupling and composed of plastic material, said bushing having a predetermined size orifice therethrough and being removably mounted in said counterbore with its inner end in abutment against said stop shoulder, whereby said bushing can be readily removed and substituted by another plastic inlet bushing having a different size orifice, the plastic composition of said bushings enabling each bushing to deform itself when being pushed into said counterbore so as to secure a tight fit of said bushing within said counterbore, and the abutment of the inner end of said bushing against said stop shoulder preventing the inner end of said bushing being projected into said circular raceway into the path of said rolling ball.

15. In a vibrator such as is defined in claim 1 wherein the raceway surfaces formed on said race rings have a concave curvature of substantially the same radius as that of said rolling ball so that the ball has more area of contact with the raceway.

References Cited in the file of this patent

UNITED STATES PATENTS

| | | |
|---|---|---|
| 1,042,323 | Clarkson | Oct. 22, 1912 |
| 1,253,548 | Wagner | Jan. 15, 1918 |
| 1,279,599 | Slaughter | Sept. 24, 1918 |
| 1,296,356 | Bey | Mar. 4, 1919 |
| 1,934,255 | Bowler | Nov. 7, 1933 |
| 2,368,033 | Makaroff | Jan. 23, 1945 |
| 2,518,250 | Peterson | Aug. 8, 1950 |
| 2,535,596 | Peterson | Dec. 26, 1950 |
| 2,778,612 | Peterson | Jan. 22, 1957 |

UNITED STATES PATENT OFFICE

CERTIFICATE OF CORRECTION

Patent No. 2,917,290

December 15, 1959

Edwin F. Peterson

It is hereby certified that error appears in the printed specification of the above numbered patent requiring correction and that the said Letters Patent should read as corrected below.

Column 7, line 29, for "distorting" read -- disturbing --.

Signed and sealed this 31st day of May 1960.

(SEAL)
Attest:

KARL H. AXLINE
Attesting Officer

ROBERT C. WATSON
Commissioner of Patents